T864001

DEFENSIVE PUBLICATION

UNITED STATES PATENT OFFICE

Published at the request of the applicant or owner in accordance with the Notice of Apr. 11, 1968, 849 O.G. 1221. Identification is by serial number of the application and the heading indicates the number of pages of specification, including claims, and of sheets of drawing contained in the application as originally filed. The file of this application is available to the public for inspection; reproduction may be purchased for 30 cents per sheet.

Applications published under the Defensive Publication Program have not been examined as to the merits of alleged invention. The Patent Office makes no assertion as to the novelty of the disclosed subject matter.

PUBLISHED JULY 15, 1969

864 O.G. 729

793,227

LOW TEMPERATURE ELECTROCOATING PROCESS

Arthur Laird Slade, Philadelphia, Pa., assignor to E. I. du Pont de Nemours and Company, Wilmington, Del., a corporation of Delaware

Continuation of application Ser. No. 500,357, Oct. 21, 1965. This application Jan. 13, 1969. Published July 15, 1969

Int. Cl. B01k *5/00*

U.S. Cl. 204—181

No Drawing. 27 Pages Specification

An improved electrocoating process with increased throwing power that comprises operating the electrocoating cell at about 0–18° C. and using a voltage that is greater than the electrocoating voltage for the particular electrocoating cell measured at 25° C. but less than the maximum electrocoating voltage for the temperature used in the process. The compositions to be electrocoated are basically film forming polymers, preferably carboxylic acid polymers, that are aminated with ammonia or an amine. Typical examples of these carboxylic acid polymers are alkyd resins, epoxy resins, acrylic resins and the reaction product of an unsaturated dicarboxylic acid anhydride and a drying oil.